United States Patent
Biswas et al.

(10) Patent No.: US 12,112,192 B2
(45) Date of Patent: Oct. 8, 2024

(54) SPLIT TRIGGERS FOR EXECUTING COMPUTER OPERATIONS

(71) Applicant: Zendesk, Inc., San Francisco, CA (US)

(72) Inventors: Sanjeev Kumar Biswas, Singapore (SG); Nguyen Truong Khanh, Singapore (SG); Ang Yi Hong, Singapore (SG); Sanjaykrishnan Kumar, Singapore (SG); Arpan Nagdeve, Singapore (SG)

(73) Assignee: Zendesk, Inc., San Francisco, CA (US)

( * ) Notice: Subject to any disclaimer, the term of this patent is extended or adjusted under 35 U.S.C. 154(b) by 533 days.

(21) Appl. No.: 17/483,182

(22) Filed: Sep. 23, 2021

(65) Prior Publication Data
US 2023/0092073 A1 Mar. 23, 2023

(51) Int. Cl.
*G06F 9/48* (2006.01)
*G06F 9/451* (2018.01)

(52) U.S. Cl.
CPC ............ *G06F 9/4843* (2013.01); *G06F 9/451* (2018.02)

(58) Field of Classification Search
CPC ....... G06F 9/4843; G06F 9/451; H04L 67/34; H04L 67/306; H04L 67/141
See application file for complete search history.

(56) References Cited

U.S. PATENT DOCUMENTS

| | | | |
|---|---|---|---|
| 2010/0162274 A1* | 6/2010 | Gangadharappa | G06F 9/451 719/328 |
| 2011/0276624 A1* | 11/2011 | Akhtar | H04L 67/34 709/203 |
| 2014/0188607 A1 | 7/2014 | Yang | |
| 2015/0269274 A1* | 9/2015 | Zhang | G06F 8/61 715/234 |
| 2017/0063970 A1 | 3/2017 | Nomura | |
| 2017/0134457 A1 | 5/2017 | Bae et al. | |

FOREIGN PATENT DOCUMENTS

| | | |
|---|---|---|
| KR | 102200604 B1 | 1/2021 |
| WO | 2016191737 A2 | 12/2016 |

\* cited by examiner

*Primary Examiner* — Jorge A Chu Joy-Davila
(74) *Attorney, Agent, or Firm* — Park, Vaughan, Fleming & Dowler LLP; Daniel E. Vaughan

(57) ABSTRACT

One or more computer operations are triggered and executed when multiple sets of conditions that define a split trigger and that are evaluated at multiple locations are satisfied. The operations may involve allocating or deallocating computing resources (e.g., by establishing or tearing down a persistent connection), generating a message to be displayed on a computing device, altering stored data, and/or other activity. In an illustrative client/server computing environment, a first set of client conditions of a first split trigger is evaluated at a client device, using parameters observable at the client without interaction with a server. When the first of client conditions is satisfied, the client transmits a signal to a server that then evaluates a first set of server conditions of the first split trigger. If the first sets of client conditions and server conditions are satisfied, the computer operation(s) associated with the split trigger are executed.

20 Claims, 4 Drawing Sheets

SPLIT TRIGGERS FOR EXECUTING COMPUTER OPERATIONS

BACKGROUND

This disclosure relates to the field of computer operations. More particularly, a system and method are provided for executing one or more computer operations involving multiple entities only when elements of a trigger associated with the action are evaluated and satisfied at both entities.

During a communication session between two computing entities, such as a client and a server, one of the entities may initiate a predetermined action based on the occurrence of one or more particular events. For example, if a client computing system connects to a website and remains on a particular page for a threshold period of time, a server associated with the website may cause a pop-up message to be displayed at the client.

Traditionally, in this type of environment the action is driven by a single entity—the server. Thus, the server may receive a constant stream of events that reflect the client's activity (or lack of activity), examine the events, and determine whether the necessary events have occurred. This may involve significant processing cycles on the part of the server.

In addition, in order to enable the server to receive and monitor the activity of a specific client, and to proactively communicate with the client, it may be necessary to allocate dedicated resources to the client's communication session. However, establishing a persistent HTTP (HyperText Transport Protocol) connection (or other persistent connection) for every client session can become quite expensive in terms of resources. All resources dedicated in this manner become unavailable for other purposes and other communication sessions.

In addition, events for which a server searches may never occur during many communication sessions. Specifically, during many sessions the connected clients may never perform all of the activities that cause the events the server must observe in order to initiate particular activities. For these sessions, the allocated resources were wasted and could have been better utilized in some other manner.

SUMMARY

In some embodiments, systems and methods are provided for splitting the detection and evaluation of computing activity and operating conditions among different computing entities, to determine whether multiple sets of predetermined conditions necessary for triggering execution of a conditional computer operation have occurred or been satisfied.

For example, in a client/server computing environment a split trigger for activating a conditional operation may be split between a client and a server with which the client communicates (e.g., a web server, a data server, an application server). In an illustrative implementation, a widget or other set of code that executes on the client (e.g., a plug-in for an application or browser) is configured to monitor client/user activity for occurrence of a first set of conditions that correspond to the trigger and that are observable at the client. Thus, while the client executes a particular application or browses a particular website or webpage, the widget determines whether the first set of conditions has been satisfied.

When satisfied, the widget or the client signals the server and the server evaluates a second set of conditions corresponding to the trigger and observable at the server. If the second set of conditions is satisfied, the server may perform one or more operations associated with the trigger. For example, it may dedicate necessary resources and establish a persistent (e.g., WebSocket) connection between the client and the server in order to enable messaging between the user and an agent, it may alter a profile of the user, or it may take some other action(s).

Thus, the server avoids the expenditure of processing resources to evaluate the first set of conditions corresponding to the trigger, because those conditions are evaluated at the client. Further, the server avoids dedicating resources to persistent connections with clients, and/or for other purposes, when it is not certain that a persistent connection is needed or will be used.

DETAILED DESCRIPTION

Figure 1:
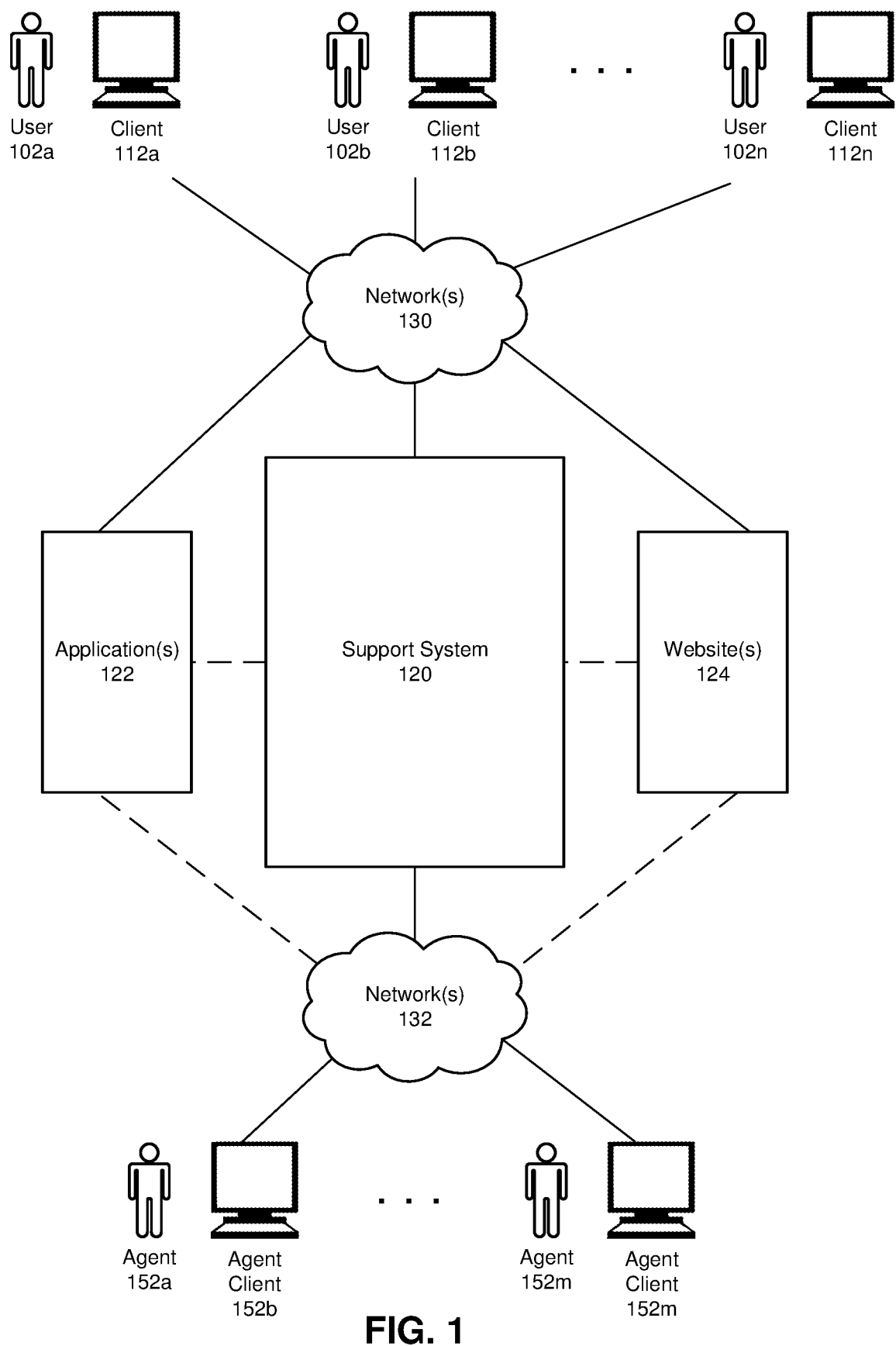
FIG. 1 is a block diagram of a computing environment in which a trigger that activates a computer operation is split between multiple computing entities, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system and method are provided for creating and using split triggers to activate conditional computer operations. A split trigger comprises multiple sets of conditions that are evaluated and that must be satisfied on different entities within a given computing environment. For example, in a client-server computer environment, one set of conditions for a particular split trigger is evaluated on a client, and must be satisfied on the client before a second set of conditions for the same split trigger is evaluated on a server. Only if both sets of conditions are satisfied on their respective platforms, possibly within a threshold period of time, will one or more computer operations associated with the split trigger be executed.

In other computing environments, more than two sets of conditions may be evaluated on more than two entities. For example, besides a client and a server with which the client communicates, another server (e.g., a data server, a remote server) that may be operated by a different organization may be involved and a third set of conditions for a split trigger may need to be evaluated and satisfied on the other server before an operation associated with the trigger is executed.

In some implementations, the computer operation or operations associated with a split trigger may involve allocation or use of limited resources (e.g., memory, permanent storage, processor cycles, communication bandwidth, communication sockets) for a particular purpose. For example, only after all sets of conditions for a split trigger are satisfied might a server open or accept a persistent communication connection (e.g., a WebSocket connection) with a client, which requires the server to dedicate resources to the connection. In these implementations, not only does the server avoid dedicating resources until and unless they are needed, it also avoids having to evaluate all trigger conditions because some were offloaded to the client.

In other implementations, a computer operation activated by a split trigger may involve modifying or updating a helpdesk ticket (e.g., a request for assistance from a user), a user profile, or other stored data; displaying a message at a client; bringing additional resources online or taking some resources offline (e.g., due to demand for the resources); modifying or replacing content offered to clients; performing a security scan, or some other activity.

FIG. 1 is a block diagram of a computing environment that implements split triggers, according to some embodiments. In these embodiments, users 102 (e.g., users 102a, 102b, . . . , 102n) employ client computing devices 112 (e.g., clients 112a, 112b, . . . , 112n) to access application(s) 122 and/or website(s) 124 via one or more networks 130 (e.g., the Internet, a local area network). Clients 112 may include stationary and/or portable computers (e.g., desktops, laptops), smartphones, and/or other computing/communication devices (e.g., an iPad®, a portable digital assistant).

Application(s) 122 and website(s) 124 may be used for any purpose or purposes that involve interaction with users, such as data communications, office automation software, shopping (e.g., ecommerce), social networking, gaming, etc. Support system 120 comprises multiple servers and/or other computing devices for supporting application(s) 122 and website(s) 124 and for assisting users 102.

For example, support system 120 may provide customer service or helpdesk functionality for an application or website, through which assistance is provided to users automatically and/or on demand. To further assist users, agents 142 (e.g., agents 142a, . . . , 142m) operate agent clients 152 (e.g., agent clients 152a, . . . , 152m) to communicate with users 102 and/or clients 112 directly and/or via support system 120, application(s) 122, or website(s) 124. Agents 142 and agent clients 152 may be considered part of or separate from support system 120 and communicate via networks 132, which may include some or all of networks 130.

In some embodiments, when a user 102 opens an application 122 on his or her client 112, or navigates to a particular website 124 or URL (Uniform Resource Locator), a communication connection is automatically opened with support system 120, directly with client 112 or through the application or website. As described below, support system 120 (e.g., one or more computer servers operating as part of the support system) implement and support split triggers for activating computer operations on behalf of users 102 and/or in response to use of an application 122 or website 124.

Different applications and/or websites affiliated with support system 120 may be associated with different organizations (e.g., different companies, different service providers, different government agencies, different teams or departments within an organization). Therefore, support system 120 may provide different operations to users of different applications/websites, or may customize operations to suit requirements or specifications provided by the different organizations. For example, user interfaces and/or communications between an agent and a user may be tailored (e.g., in terms of appearance and/or functionality), and different split triggers or different versions of a split trigger may be employed for different applications and/or websites.

Figure 2:
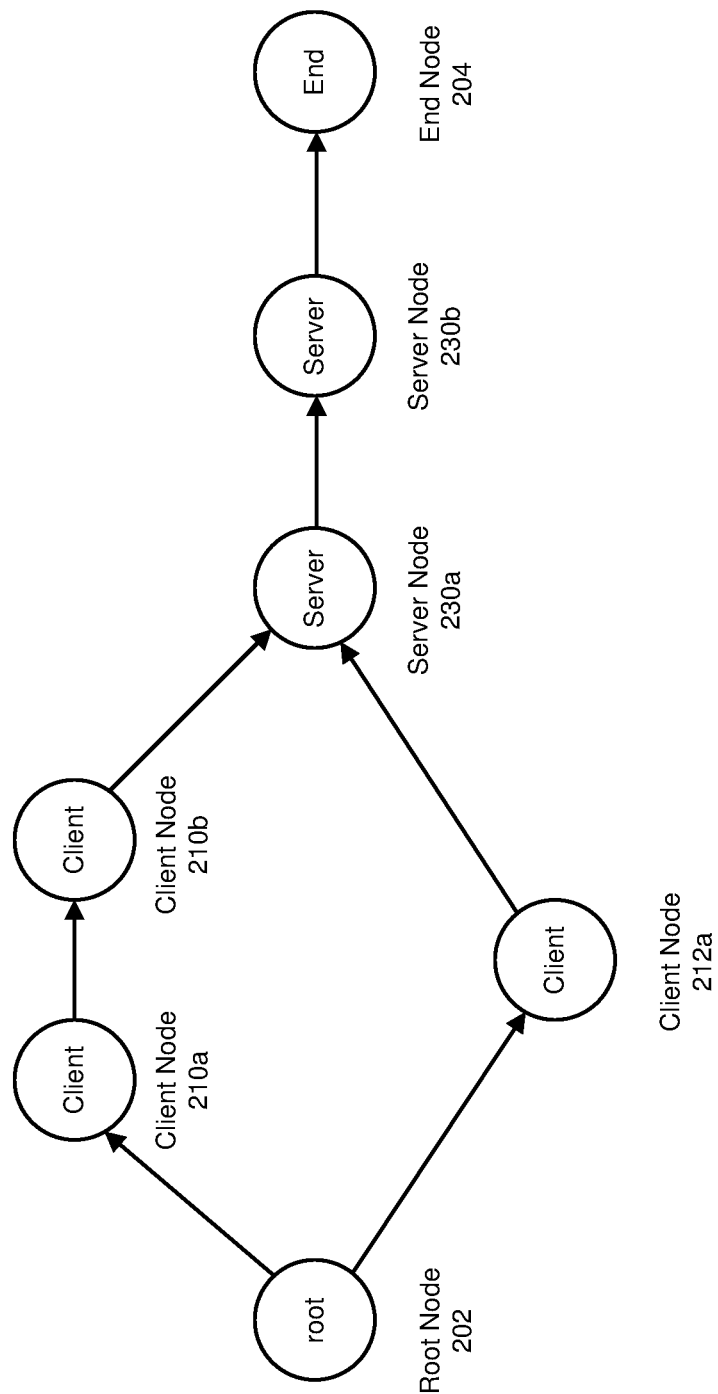
FIG. 2 illustrates a simple split trigger in accordance with some embodiments.

FIG. 2 illustrates a simple split trigger, according to some embodiments. In these embodiments, a split trigger is represented as a directed graph comprising nodes, each of which represents one or more conditions that may or must be satisfied in order to trigger or activate one or more computer operations. Root node 202 is a starting point for the split trigger and may or may not have associated conditions; end node 204 represents the computer operation(s) that will be initiated upon completion or satisfaction of the trigger (e.g., after the condition(s) associated with node 230b are satisfied).

Each other node shown in split trigger 200 of FIG. 2 has one or more corresponding conditions and a location at which the condition is evaluated (e.g., a client, a server, a data storage device, a network or communication device). For example, within split trigger 200, some nodes (nodes 210a, 210b, 212a) are evaluated at a client device, while other nodes (nodes 230a, 230b) are evaluated at a server.

When split trigger 200 is evaluated, examination begins at root node 202, where two paths originate. Only if all conditions along one or both paths are evaluated at the client and found to be satisfied will the conditions associated with the server nodes be evaluated at the server. In particular, if conditions associated with client nodes 210a and 210b or if conditions associated with client node 212a are evaluated and found to be true or to be satisfied, processing of server nodes in split trigger 200 will continue at the server, as discussed in more detail below. Then, if conditions associated with server nodes 230a, 230b are also satisfied, the computer operation(s) represented by end node 204 are executed, which may involve activity at the client, the server, and/or elsewhere.

In some implementations, no more than a threshold period of time may elapse from commencement of evaluation of split trigger 200 until a final node (e.g., node 230b) is satisfied in order for the operations to be executed. Also, or instead, a maximum period of time may be permitted between successful evaluation of successive nodes, or for successful evaluation of all nodes of a given type (e.g., client, server), or for some other subset of the processing associated with split trigger 200. If a threshold or maximum period of time expires, evaluation may resume at root node 202, at a node that preceded the time expiration, or at some other node.

A given split trigger may include any number of paths, and may be cyclic or acyclic. Moreover, one or more nodes of one type (e.g., a client node) may be situated between nodes of a different type (e.g., server nodes), in which case evaluation of conditions corresponding to the split trigger may alternate between different platforms (e.g., client, server) more than one time. Or, even in this situation all conditions may be evaluated on one entity, even though the entity's nodes are not consecutive, before evaluation proceeds to another entity.

Figure 3:
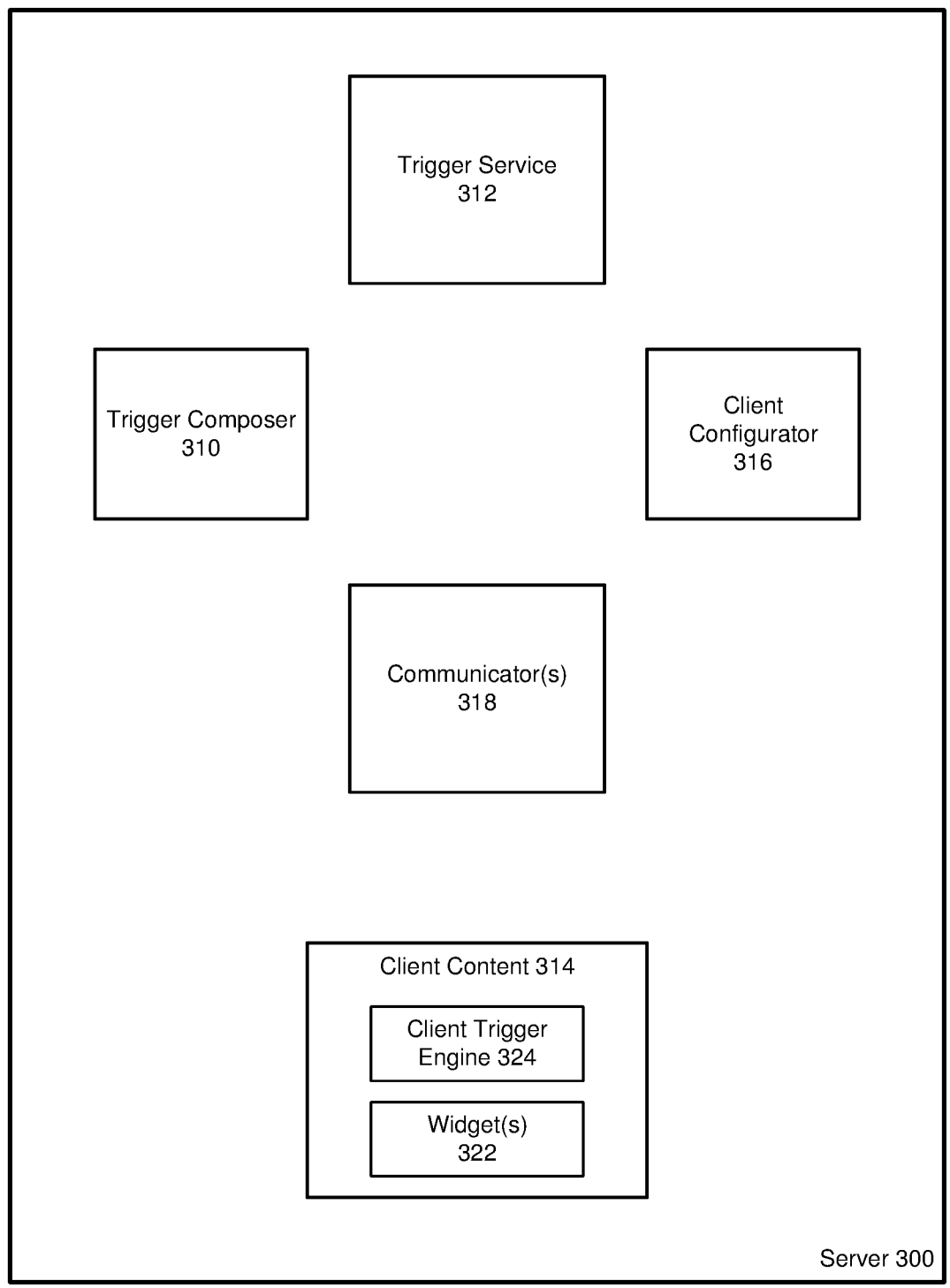
FIG. 3 is a block diagram of a computer server for creating and supporting split triggers, in accordance with some embodiments.

FIG. 3 is a block diagram of a server computer for supporting creation and execution of split triggers, according to some embodiments. One or more servers 300 may be deployed within an entity such as support system 120 of FIG. 1.

Server 300 of FIG. 3 includes trigger composer 310, trigger service 312, client content 314, client configurator 316, and communicator(s) 318. Each of these may be implemented as a module, function, service, program, repository or other collection of executable program code and/or data. In other embodiments, some or all of these modules may be aggregated or subdivided, and some may be deployed on separate servers. Thus, server 300 may represent a combination of multiple physical servers and/or a virtual operating environment hosted by one or more physical servers. Although not shown in FIG. 3, server 300 includes one or more processors, memory for transient storage of data and/or program code, one or more devices (or connections to such devices) for persistent storage, appropriate input/output devices, etc.

Trigger composer 310 provides a user interface to an administrator, system operator, or other person responsible for creating triggers for activating computer operations. In some implementations, the user interface enables the administrator to create or define a trigger in the form of a graph, such as the directed graph of FIG. 2. In particular, the administrator identifies one or more conditions that must occur or be satisfied in order for a specified computer operation to be executed. The conditions may be automatically represented as separate nodes, or the administrator may manually group multiple conditions into a single node.

In an illustrative implementation, for each condition included in a trigger, the administrator selects some number of parameters (e.g., operating parameters, system parameters, browser parameters), specifies a target value for each parameter, and selects an operator indicating the relationship between the parameter and the value (e.g., equal to, greater than, less than) that must be observed in order for the condition to be satisfied. Parameters available for selection by the administrator may illustratively be divided or segregated by application or website (e.g., application 122, website 124 of FIG. 1), by products or services a user may access via an application or website, by organizations associated with applications or websites, or in some other manner. Thus, different triggers may be defined for different contexts encountered by a user.

Illustrative parameters include the current time (e.g., hour, hour and minute); day of the week; the website, domain, or page a user is connected to; whether a user has been connected to a particular website, domain, or page for a specified period of time; user network (e.g., IP) address; a user's geographical region or country; a user identifier (e.g., email address); a user's name; user status (e.g., active, idle); type of user client; whether a user is communicating with an agent; searches conducted by a user; and so on.

Each node within a graph representing a trigger contains one or more conditions, wherein each condition comprises one parameter, one operator, and one value. The node evaluates to true, and is thereby satisfied, when the relationship between the parameter and the value (in the context of a given user's current session with an application or website) matches the operator for each of the node's conditions. When multiple conditions are grouped in a single node, one or more specified Boolean operators (e.g., OR, AND) indicate the manner in which the node evaluates to true or is satisfied.

When a given node has only one following node (e.g., as between nodes 210a and 210b and between nodes 230a and 230b in split trigger 200 of FIG. 2), the Boolean operator AND applies between them automatically. When a given node has multiple outputs (e.g., root node 202 of split trigger 200), the Boolean operator OR applies to the multiple branches, thereby creating multiple distinct paths.

Finally, the administrator selects or specifies one or more operations to perform upon satisfaction of the trigger (e.g., when the end node is reached). Illustrative actions include establishing a persistent (e.g., WebSocket) connection with a user, agent or third party, allocating system resources for some other purpose, sending a message (e.g., to a user, to an agent, to a third party), updating stored data (e.g., in a user profile, in a ticket associated with a service request from a user), modifying an application or a webpage within a website (e.g., to correct an error, to add or remove information), bringing resources online or taking them offline (e.g., in response to increased or decreased demand), performing a security scan (e.g., of stored data, of a user or client), scanning data for viruses and/or other malware, etc.

Thus, trigger composer 310 of server 300 enables an administrator or other operator to define triggers in terms of conditions that comprise relationships between parameters of a user's application or website connection and specified values for those parameters. The trigger may be represented as a graph in some embodiments, and in other forms (e.g., text) in other embodiments.

Trigger Service 312 of server 300 receives and stores each trigger created via trigger composer 310. Also, the trigger service splits each trigger based on where its nodes will be evaluated. Thus, the administrator that creates a trigger need not specify how or where a node or condition is evaluated; the trigger service will automatically modify the triggers to form split triggers. Every split trigger is assigned a unique trigger identifier, either by trigger server 312 or trigger composer 310.

To split a trigger, the trigger service identifies where the various conditions of the trigger should be evaluated. Thus, in the illustrative client/server computing environment described above, some nodes will be evaluated at a client, while other nodes are evaluated at a server. Within a given node of the graph representing the trigger, all conditions will be evaluated at the same location (e.g., client or server). If a node configured by an administrator when the trigger was created contains conditions to be evaluated at different locations, the graph will be automatically revised to resolve the conflict, by splitting that node's conditions and possibly regrouping other nodes and/or conditions appropriately.

In some embodiments, client conditions (i.e., conditions to be evaluated at a client) are based on user/client-centric parameters such as client location, type of client device, type of browser, address (e.g., IP or Internet Protocol address) or identifier (e.g., a user identifier), application or webpage the user is visiting, amount of time the user has visited the application or page, application/website activity (e.g., clicks, page views, shopping cart), and so on, and are marked (or their nodes are marked) for evaluation on a client.

Conversely, conditions that are based on parameters not known or maintained on a client are marked (or their nodes are marked) for evaluation on a server or other back-end system. Server conditions (conditions to be evaluated at a server) may involve determining whether necessary resources are available for an operation, whether the helpdesk associated with an application or webpage is open, whether any agents are online or otherwise available, whether a special offer is available for a particular user, etc. In general, conditions based on parameters that comprise information that an organization desires to keep confidential may be selected for evaluation at a location other than a client.

Because the trigger service splits triggers automatically, to identify where each node's conditions will be evaluated, if the locus for a node's condition(s) changes, such that the condition or conditions now can be evaluated at a client, whereas they had previously been marked for evaluation at a server, for example, the node can be reassigned and the split trigger updated with no manual intervention. Moreover, the administrator that creates a trigger need not specify or even know where the trigger's various conditions can or should be evaluated.

When a graphical representation of a split trigger is maintained, possibly for interfacing with an administrator or other system operator (e.g., to allow the trigger to be modified or replicated), the appearance of the trigger's nodes may be customized after the trigger is split, in order to reflect where they are evaluated. For example, nodes evaluated at a client may be displayed with one color, shading, fill pattern, shape, or other graphical characteristic, while nodes evaluated at a server may be displayed with a different graphical characteristic.

After being split to identify where its nodes and conditions will be evaluated, a split trigger that includes multiple paths (such as split trigger 200 of FIG. 2) is divided by trigger service 312 into some or all possible paths. Thus, trigger 200 of FIG. 2 can be split into two paths:

Node 202-node 210a-node 210b-node 230a-node 230b-node 204

Node 202-node 212a-node 230a-node 230b-node 204

As discussed below, when a split trigger is downloaded to a client for evaluation, all paths of the trigger that include client conditions will be downloaded. Each path is assigned a separate and unique identifier, which may be based on the split trigger's unique identifier. In some implementations, however, split triggers and/or split trigger paths that are downloaded to a client are modified to remove conditions and/or nodes that are evaluated at locations other than the client. Thus, the client will know which trigger conditions it must evaluate, but may remain uninformed regarding other conditions.

Client content module 314 of server 300 maintains program code and/or data for downloading to a client. For example, when a user client connects to or opens a session with an application or website supported by support system 120 within the environment depicted in FIG. 1, widget 322 is automatically downloaded to and initialized on the client. In an illustrative implementation, it may be embedded in a webpage opened by the client.

Widget 322 may be generic, meaning that it may support user connections with multiple applications and/or multiple websites, regardless of the organizations associated with the applications or websites. Its generic nature allows widget 322 to facilitate communication between server 300 and any user client that opens one of the applications or that visits one of the websites.

Similarly, client trigger engine 324 is downloaded to the client and is executed while the client executes the application or browses the webpage. The client trigger engine, which may be part of widget 322 in some embodiments, monitors user and/or client activity and parameters to determine whether and when conditions of one or more triggers are satisfied.

Client configurator module 316 provides additional code and/or data for downloading to a client. For example, the client configurator may provide a replacement widget that replaces widget 322, on a client, with a widget that is customized for a particular application, website, or organization, or may provide customization details used by widget 322 to configure or reconfigure itself. Thus, in embodiments in which the widget provides an on-screen interface for a user to obtain customer service or other assistance, the customization details may be applied to cause the widget to exhibit a particular appearance (e.g., size, location, color(s), font, logo(s)).

Client configurator 316 also downloads to a client the trigger conditions that the client (e.g., the client trigger engine) will evaluate, after receiving or retrieving them from trigger service 312. Illustratively, when the client opens a specific application (or a specific feature of an application), or browses to a particular website (or a particular page within a website), client configurator 316 provides the client with some or all split triggers that pertain to the application, the website, and/or the associated organization. As indicated above, a given split trigger may be downloaded in the form of multiple paths if the trigger contains more than one path. However, the split triggers (or paths) may include only nodes that are to be evaluated at the client; nodes evaluated elsewhere may be omitted.

Communicator(s) 318 include automated agents for providing customer service, user assistance, and/or other aid, and/or links to human agents for providing such aid. In some embodiments, one or more split triggers, when activated, cause necessary resources to be allocated and a persistent communication connection to be established between communicator(s) module 318 and a user client. A user that operates the client may then interact with an automated agent and/or request to interact with a human agent.

Figure 4:
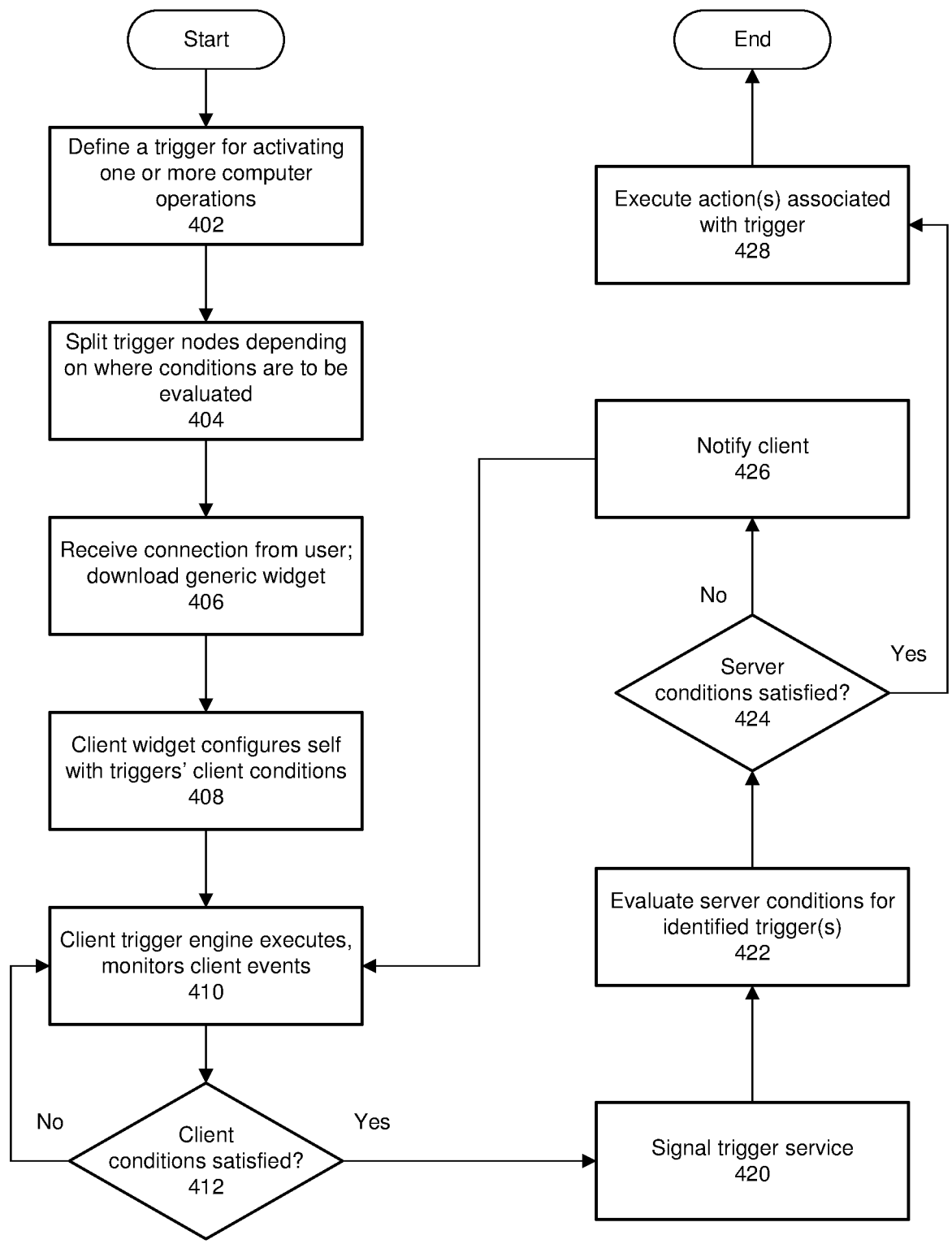
FIG. 4 is a flow chart illustrating a method of using a split-trigger, in accordance with some embodiments.

FIG. 4 is a flow chart illustrating a method of using split triggers to trigger execution of computer operations, according to some embodiments.

In these embodiments, the split triggers are deployed in a client-server computing environment such as the environment depicted in FIG. 1. In this environment, users operate client computing devices to access one or more applications and/or webpages associated with different organizations. A given application or website facilitates online activity such as e-commerce, social networking, data transfers, etc.

To assist users in using an application or website, a helpdesk, customer service center, or other support system interacts with users' clients as they execute the application or visit the website. The support system employs the split triggers to determine when to execute particular computer operations to assist a user, to allocate computing resources for some purpose (e.g., to establish and maintain a persistent communication connection, to execute a data transfer), to perform some back-end processing, or take some other action.

In operation 402 of the illustrated method an administrator configures a trigger to identify conditions that are to be observed or satisfied in order to execute one or more specified computer operations, without regard for where the conditions will be evaluated. In a computing environment in which these embodiments may be implemented, different organizations may be associated with different applications or websites and may define triggers specific to their needs. Also, or instead, a support system operator may define one or more triggers that apply to multiple applications and/or websites. Each trigger is assigned a unique identifier.

As described above, the administrator or operator may create or define the trigger in the form of a graph comprising multiple nodes, wherein each node comprises one or more conditions. A condition may be based on a particular parameter associated with operation of a client or server, a context within an application or website, etc., wherein the parameter as observed by the evaluating entity must have a particular relationship with a specified value. The relationship may be mathematical or comparative, such as greater-than, equal-to, etc., may be textual, meaning that the parameter has a textual value that must match, include, not include, or have some other relationship to a specified textual value, or may employ some other type or types of operators and/or relationships.

In operation 404, a trigger service receives the trigger configured in operation 402 and automatically splits it by identifying locations for evaluating each node of the trigger graph or, more specifically, for evaluating the conditions of each node. Therefore, in the specified client-server operating environment some nodes may be marked or coded for evaluation on a client device while other nodes may be marked or coded for evaluation on a server. The service stores each split trigger.

Also, the trigger service may parse a split trigger into multiple paths if multiple paths from the root node to the end node of the trigger exist. Moreover, multiple versions of each path may be stored. Specifically, a client version of each path may be created and stored that includes only nodes to be evaluated at a client. Alternatively, a client version of a path may be generated on-the-fly when it is to be downloaded to a client. Each path may receive a separate unique identifier that may tie it to the split trigger that encompasses the path.

In operation 406 a connection is received from a user client, at an application or website, and at a support system. As part of the process of establishing the connection, a widget for facilitating interaction between the client and the support system is downloaded and initialized on the client. The widget may include a user interface that allows the user of the client to request assistance, obtain information related to the application or website, etc.

In the currently described embodiments, the connection that is established during this operation is non-persistent or session-less, such as a non-persistent HTTP (HyperText Transport Protocol) connection. During this connection the client makes necessary calls to download content, forms, style sheets, and so on in order to use the application and/or navigate the website.

Upon initialization, in operation 408 the widget downloads (e.g., from a client configurator module of a server) a replacement customized widget associated with the application or website currently being visited (or an organization corresponding to the application or website) or configuration details for customizing the widget. This may cause the widget to have a specified appearance or behavior that is different from that of the generic widget originally obtained in operation 406.

Also in operation 408, the widget retrieves or receives client conditions for one or more split triggers. For example, in the illustrated method the client performs one or more REST (REpresentational State Transfer) API (Application Programming Interface) calls using HTTP or HTTP/S to fetch all client conditions that the client will monitor. As described above, the client conditions may be received as distinct sets that correspond to different split triggers and/or different paths through the split triggers.

In operation 410, a client trigger engine executes and monitors the conditions of some or all split triggers or paths of split triggers that were received in operation 408. For example, starting with the first node or condition of each trigger or trigger path, the trigger engine continually, regularly, or periodically examines the associated parameter and its current relationship to the specified value. When a given condition is satisfied (or all conditions within a multi-condition node are satisfied) in a trigger or path, the trigger engine moves on and begins evaluating the next condition (or the condition(s) of the next node).

Thus, in these embodiments, the conditions of a trigger path are evaluated in the order specified in the split trigger that encompasses the path, such that a given condition may be evaluated only after preceding conditions in the same path are satisfied. In other embodiments multiple conditions in a single split trigger or trigger path may be monitored or evaluated in parallel.

The client trigger engine may be part of the widget executing on the client or may be downloaded and executed separately, but communicate with the widget to receive the client conditions, to inform the widget when a trigger or path is satisfied, etc.

In operation 412, when a split trigger is satisfied at the client or, more particularly, when the client conditions of a path of a split trigger are satisfied at the client, the illustrated method advances to operation 420. Until then, the method returns to operation 410 to continue to evaluate client conditions in light of ongoing events and activity at the client.

In operation 420, the client widget sends a signal to a server, such as trigger service 312 or client configurator 316 of server 300 of FIG. 3, to indicate that client conditions have been satisfied for a split trigger. The signal identifies the split trigger, the trigger path (if necessary), and any other pertinent information (e.g., a client or user identifier, a session identifier, a timestamp).

In operation 422, the server (e.g., the trigger service) evaluates some or all server conditions for the same trigger and trigger path that was satisfied on the client, in the order specified in the graph corresponding to the trigger, in parallel, or in some other order.

In operation 424, if the server conditions are satisfied, and if the split trigger comprises only client conditions and server conditions (i.e., no additional conditions must be evaluated elsewhere), the method advances to operation 428. Otherwise, if some or all server conditions are unsatisfied, the method continues at operation 426. In some implementations, the server may reevaluate unsatisfied conditions multiple times, over some relatively short period of time (e.g., one second, multiple seconds) before continuing to operation 426.

In some embodiments, the server evaluates server conditions of some or all split triggers on a regular basis without waiting for a signal from a client. In these embodiments, operation 424 may involve determining whether the server conditions corresponding to the satisfied client conditions were satisfied the last time they were examined, instead of re-evaluating them now.

In operation 426, the client (e.g., the client trigger engine, the widget) is notified that the split trigger failed. In this event, the client may resume monitoring the client conditions for the same trigger or trigger path, but may pause for a default or specified time period. For example, as part of the signal that notifies the client of the failed split trigger, the server may specify that the client should refrain from evaluating the same conditions or from reporting satisfaction of the conditions, for some period of time (e.g., five minutes, one hour).

After operation 426, the method returns to operation 410 to resume evaluation of trigger conditions. It should be noted that after the client reports satisfaction of a particular split trigger or split trigger path (as in operation 420), it may stop evaluating those conditions as part of that trigger or path, but will continue evaluating conditions of other split triggers and trigger paths, some of which conditions may be identical to those already found to be satisfied.

In operation 428, a split trigger (e.g., a specific path through a split trigger) has been satisfied, and therefore the server executes the associated computer operation(s) and/or causes one or more other entities to execute the operation(s). For example, if some action is required on the client side, the trigger service or other server entity (e.g., a client configurator) may signal the client (e.g., the client trigger engine, the widget) to specify the action to take (e.g., initiate a persistent communication connection with a specified endpoint, to upload or download a specified set of data). The illustrated method ends after operation 428, or may return to a previous operation (e.g., operation 410).

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method comprising:
   constructing at a server one or more triggers for activating associated computer operations;
   automatically splitting each of the one or more triggers by identifying, within the trigger, a first set of conditions and a second set of conditions;
   receiving at the server a first non-persistent communication connection from a client computing device;
   for each of the one or more triggers, transmitting to the client a corresponding first set of conditions, wherein a corresponding second set of conditions for each of the multiple triggers is stored at the server;
   receiving from the client a signal indicating that a first set of conditions corresponding to a first trigger has been satisfied at the client;
   retrieving the second set of conditions corresponding to the first trigger; and
   executing one or more computer operations associated with the first trigger only if the second set of conditions has been satisfied;
   wherein constructing the one or more triggers comprises, for each trigger:
      obtaining the corresponding first set of conditions and second set of conditions; and
      constructing a directed graph comprising multiple nodes, wherein each of the multiple nodes comprises one or more of the first set of conditions or one or more of the second set of conditions.

2. The method of claim 1, further comprising:
   transmitting a widget to the client, via the first non-persistent communication connection;
   wherein the widget facilitates interaction between the client and a support system for supporting use of one or more applications and/or websites.

3. The method of claim 1, further comprising:
   transmitting a trigger engine to the client, via the first non-persistent communication connection;
   wherein the trigger engine evaluates the first set of conditions for each of the multiple triggers.

4. The method of claim 1, wherein each condition in each first set of conditions comprises a parameter observable at the client without interaction with the server.

5. The method of claim 1, wherein the one or more computer operations include establishing a first persistent communication between the client and the server.

6. The method of claim 1, further comprising:
   dividing the first trigger into multiple paths.

7. The method of claim 6, wherein transmitting to the client the first set of conditions comprises transmitting to the client one or more of the multiple paths.

8. The method of claim 6, wherein transmitting to the client the first set of conditions comprises:
   removing the second set of conditions from one or more of the multiple paths; and
   transmitting to the client the one or more of the multiple paths from which the second set of conditions was removed.

9. The method of claim 6,
   wherein each condition in the first set of conditions and the second set of conditions comprises a parameter, a target value, and an operator that identifies a relationship between the parameter and the target value.

10. The method of claim 1, wherein the one or more computer operations include at least one of the following:
    updating a customer support ticket associated with a customer support request received from the client;
    transmitting one or more communications regarding a customer support ticket associated with a customer support request received from the client;
    modifying a user profile associated with a user of the client; and
    prohibiting a user of the client from using a communication utility hosted by the server.

11. A non-transitory computer-readable medium storing instructions that, when executed by a processor, cause the processor to perform a method comprising:
constructing at a server one or more triggers for activating associated computer operations;
automatically splitting each of the one or more triggers by identifying, within the trigger, a first set of conditions and a second set of conditions;
receiving at the server a first non-persistent communication connection from a client computing device;
for each of the one or more triggers, transmitting to the client a corresponding first set of conditions, wherein a corresponding second set of conditions for each of the multiple triggers is stored at the server;
receiving from the client a signal indicating that a first set of conditions corresponding to a first trigger has been satisfied at the client;
retrieving the second set of conditions corresponding to the first trigger; and
executing one or more computer operations associated with the first trigger only if the second set of conditions has been satisfied;
wherein constructing the one or more triggers comprises, for each trigger:
obtaining the corresponding first set of conditions and second set of conditions; and
constructing a directed graph comprising multiple nodes, wherein each of the multiple nodes comprises one or more of the first set of conditions or one or more of the second set of conditions.

12. The non-transitory computer readable medium of claim 11, wherein the method further comprises:
transmitting a widget to the client via the first non-persistent communication connection;
wherein the widget is executed by the client to facilitate interaction between the client and a support system for supporting use of one or more applications and/or websites.

13. The non-transitory computer readable medium of claim 11, wherein the method further comprises:
transmitting a trigger engine to the client via the first non-persistent communication connection;
wherein the trigger engine is executed by the client to evaluate the first set of conditions for each of the multiple triggers.

14. The non-transitory computer readable medium of claim 11, wherein each condition in each first set of conditions comprises a parameter observable at the client without interaction with the server.

15. The non-transitory computer readable medium of claim 11, wherein the method further comprises:
dividing the first trigger into multiple paths.

16. The system of claim 15, wherein transmitting to the client the first set of conditions comprises transmitting to the client one or more of the multiple paths.

17. A server computer system, comprising:
one or more processors; and
memory storing instructions that, when executed by the one or more processors, cause the server to:
construct one or more triggers for activating associated computer operations;
automatically split each of the one or more triggers by identifying, within the trigger, a first set of conditions and a second set of conditions;
receive a first non-persistent communication connection from a client computing device;
for each of the one or more triggers, transmit to the client a corresponding first set of conditions, wherein a corresponding second set of conditions for each of the multiple triggers is stored at the server;
receive from the client a signal indicating that a first set of conditions corresponding to a first trigger has been satisfied at the client;
retrieve the second set of conditions corresponding to the first trigger; and
execute one or more computer operations associated with the first trigger only if the second set of conditions has been satisfied;
wherein constructing the one or more triggers comprises, for each trigger:
obtaining the corresponding first set of conditions and second set of conditions; and
constructing a directed graph comprising multiple nodes, wherein each of the multiple nodes comprises one or more of the first set of conditions or one or more of the second set of conditions.

18. The system of claim 17, wherein the memory further stores instructions that, when executed by the one or more processors, cause the server to:
transmit a widget to the client via the first non-persistent communication connection; and
transmit a trigger engine to the client via the first non-persistent communication connection;
wherein the widget is executed by the client to facilitate interaction between the client and a support system for supporting use of one or more applications and/or websites; and
wherein the trigger engine is executed by the client to evaluate the first set of conditions for each of the multiple triggers.

19. The system of claim 17, wherein the memory further stores instructions that, when executed by the one or more processors, cause the server to:
divide the first trigger into multiple paths.

20. The system of claim 19, wherein transmitting to the client the first set of conditions comprises transmitting to the client one or more of the multiple paths.

* * * * *